(12) United States Patent
Andrews et al.

(10) Patent No.: US 6,787,798 B1
(45) Date of Patent: Sep. 7, 2004

(54) METHOD AND SYSTEM FOR STORING INFORMATION USING NANO-PINNED DIPOLE MAGNETIC VORTICES IN SUPERCONDUCTING MATERIALS

(75) Inventors: Malcolm J. Andrews, College Station, TX (US); Joseph H. Ross, Jr., College Station, TX (US); John C. Slattery, College Station, TX (US); Mustafa Yavuz, Bryan, TX (US); Ali Beskok, College Station, TX (US); Karl T. Hartwig, Jr., College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 10/051,554

(22) Filed: Jan. 17, 2002

Related U.S. Application Data (60) Provisional application No. 60/262,609, filed on Jan. 17, 2001.

(51) Int. Cl.[7] .............................................. H01L 23/58
(52) U.S. Cl. .................. 257/48; 257/662; 257/663; 257/661; 257/421; 505/191; 505/235; 505/1; 505/700; 505/781; 505/705; 505/831; 505/832; 505/833; 505/836; 505/838; 505/839; 505/840; 360/55; 360/131
(58) Field of Search ........................ 257/48, 662, 663; 257/661, 421, 30, 31, 33; 505/191, 235, 1, 700, 701, 705, 231, 220, 230; 360/55, 131; 365/160; 362/19; 357/5

(56) References Cited

U.S. PATENT DOCUMENTS

| | | | | |
|---|---|---|---|---|
| 4,186,441 A | * | 1/1980 | Baechtold et al. | .......... 365/160 |
| 4,575,822 A | * | 3/1986 | Quate | .......... 365/174 |
| 4,764,898 A | * | 8/1988 | Miyahara et al. | .......... 365/162 |
| 5,051,787 A | * | 9/1991 | Hasegawa | .......... 257/34 |
| 5,079,219 A | | 1/1992 | Barnes | .......... 505/1 |
| 5,724,336 A | * | 3/1998 | Morton | .......... 369/126 |
| 5,729,046 A | * | 3/1998 | Nishino et al. | .......... 257/661 |
| 5,912,210 A | * | 6/1999 | Krusin-Elbaum et al. | ... 505/121 |
| 6,188,920 B1 | * | 2/2001 | Li et al. | .......... 505/230 |
| 6,211,673 B1 | * | 4/2001 | Gerber et al. | .......... 324/262 |
| 6,469,880 B1 | * | 10/2002 | Barabasi et al. | .......... 361/19 |
| 6,504,665 B1 | * | 1/2003 | Mukasa et al. | .......... 360/55 |

OTHER PUBLICATIONS

NN9207373, Jul. 1992, IBM Technical Disclosure Bulletin.*

NA82123380, Dec. 1982, IBM Technical Disclosure Bulletin.*

B. Binnig, M. Despont, U. Drechsler, W. Häberle, M. Lutwyche, P. Vettiger, H.J. Mamin, B.W. Chui and T.W. Kenny (1999) Appl. Phys. Lett. 74, 1329–1331, Mar. 1, 1999.

Kambe, Guo, et al., 1998, "Effect of pressing and Li–doping on superconducting. . . " J. of Supercon. Sci. Tech. v. 11, p. 1061, Feb. 2, 1998.

Majetich, S.A., and Jin, Y., (1999) "Magnetization Directions of Individual Nanoparticles" Science 284, pp. 470–473, Dec. 15, 1998.

(List continued on next page.)

*Primary Examiner*—Nathan Flynn
*Assistant Examiner*—Fazli Erdem
(74) *Attorney, Agent, or Firm*—Baker Botts L.L.P.

(57) ABSTRACT

A method includes providing a superconducting material having pinning sites that can pin magnetic vortices within the superconducting material. The method also includes pinning one or more magnetic vortices at one or more of the pinning sites. An information storage apparatus includes a superconducting material, doped particles within the superconducting material that can pin dipole magnetic vortices, a magnetic tip that generates pinned magnetic vortices and a magnetic detector that detects pinned magnetic vortices.

34 Claims, 4 Drawing Sheets

OTHER PUBLICATIONS

A. Moser, H. J. Hug, I. Parashikov, B. Stiefel, O. Fritz, H. Thomas, A. Baratoff, H.-J. Güntherodt and P. Chaudhari (1995) "OBservation of Single Vortices Condensed into a Vortex–Glass Phase by Magnetic Force Microscopy," Phys. Rev. Lett. 74 1947, Mar. 6, 1995.

S.L. Tomlinson, A. N. Farley, S. R. Hoon and M. S. Valera (1996) "Interactions between soft magnetic samples and MFM tips," J. Magnetism and Magn. Mater. 157/158, pp. 557–558, 1996.

M. Yavuz, A. Ertekin, T. O'B'rien, P. McIntyre, R. Soika, K. D. D. Rathnayaka, D. G. Naugle, and T. Hartwig (2001). Solid Solubility of Bi–Pb–Sr–Ca–Mn–O in Bi–Pb–Sr–Ca–Mn–O Superconductors. IEEE Transactions on Applied Superconductivity, vol. 11, No. 1, pp. 3446–3448, 2001.

M. Yavuz, P. McIntyre, R. Soika, D.G. Naugle, and H. Faqir (2000). "Effect of V–doping in Bi–Pb–Sr–Ca–Cu–O Superconductor Composites," Physica C, vol. 341–348 (1–4), pp. 661–662, Mar. 2001.

C. W. Yuan, Z. Zheng, A. L. de Lozanne, M. Tortonese, D. A. Rudman, and J. N. Eckstein (1996) "Vortex images in thin films of $YBa_2Cu_3O_7-x$ and $Bi_2Sr_2Ca_1Cu_2O_8+x$ obtained by low–temperature magnetic force microscopy," J. Vac. Sci. Tech B 14, 1210–1213, Mar./ Apr. 1996.

* cited by examiner

METHOD AND SYSTEM FOR STORING INFORMATION USING NANO-PINNED DIPOLE MAGNETIC VORTICES IN SUPERCONDUCTING MATERIALS

RELATED APPLICATIONS

This application claims the benefit of U.S. Provisional Application Serial No. 60/262,609, filed Jan. 17, 2001.

TECHNICAL FIELD OF THE INVENTION

This invention relates in general to information storage, and more particularly to a method and system for storing information using nano-pinned dipole magnetic vortices in superconducting materials.

BACKGROUND OF THE INVENTION

The development of materials that superconduct at relatively high temperatures allows devices to exploit the properties of superconductivity using conventional coolants such as liquid nitrogen rather than requiring coolants that are more difficult to create and use, such as liquid helium. Applications using high-temperature superconductors continue to be developed, but only a small portion of the potential scope of superconductor applications has been explored. Furthermore, many of the properties of superconductors have yet to be studied, much less applied.

U.S. Pat. No. 5,079,219, entitled "Storing information-bearing signals in a superconductive environment using vortices as digital storage elements" and issued to Barnes, discloses information-bearing signals that are stored as vortices of electrical current in a superconducting material. However, this reference does not address production of sites for anchoring magnetic vortices in superconductive materials, control of the net magnetic flux of the superconductive material, use of superconducting materials with a non-crystalline or multiple domain structure, and reliable detection of the presence of magnetic vortices.

SUMMARY OF THE INVENTION

Technical advantages of certain embodiments of the present invention include exploiting the magnetic properties of superconducting materials to provide high-density information storage. By using relatively small magnetic vortices within a superconducting material to store information, superconducting materials can provide an information storage density comparable to if not significantly greater than that of silicon-copper technology.

Other technical advantages of certain embodiments of the present invention make use of superconductors. This makes the magnetic properties of the superconducting material available using conventional coolants such as liquid nitrogen, therefore obviating the need for more complex cooling systems. Furthermore, as superconductors become available at higher temperatures, embodiments of the present invention may exploit those improvements as well.

In accordance with certain embodiments of the present invention, magnetic properties of a superconducting material are used to store information. In particular, pinning sites are created in the superconducting material. The pinning sites pin magnetic vortices within the superconducting material in close proximity to the pinning sites. The position of pinned magnetic vortices may be detected and interpreted as stored information.

In accordance with one embodiment of the present invention, a method includes providing a superconducting material having pinning sites that can pin magnetic vortices in the superconducting material. The method also includes pinning one or more magnetic vortices at one or more of the pinning sites. The locations of the pinned magnetic vortices may be interpreted as stored information.

In accordance with another embodiment of the present invention, an information storage apparatus includes a superconducting material, defects such as doped atoms within the superconducting material, a magnetic tip and a magnetic detector. The doped particles can pin magnetic vortices within the superconducting material. The magnetic tip generates pinned magnetic vortices when positioned in sufficiently close proximity to the superconducting material. The magnetic detector detects any pinned vortices at any of the pinning sites.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF EXAMPLE EMBODIMENTS OF THE INVENTION

Figure 1A:
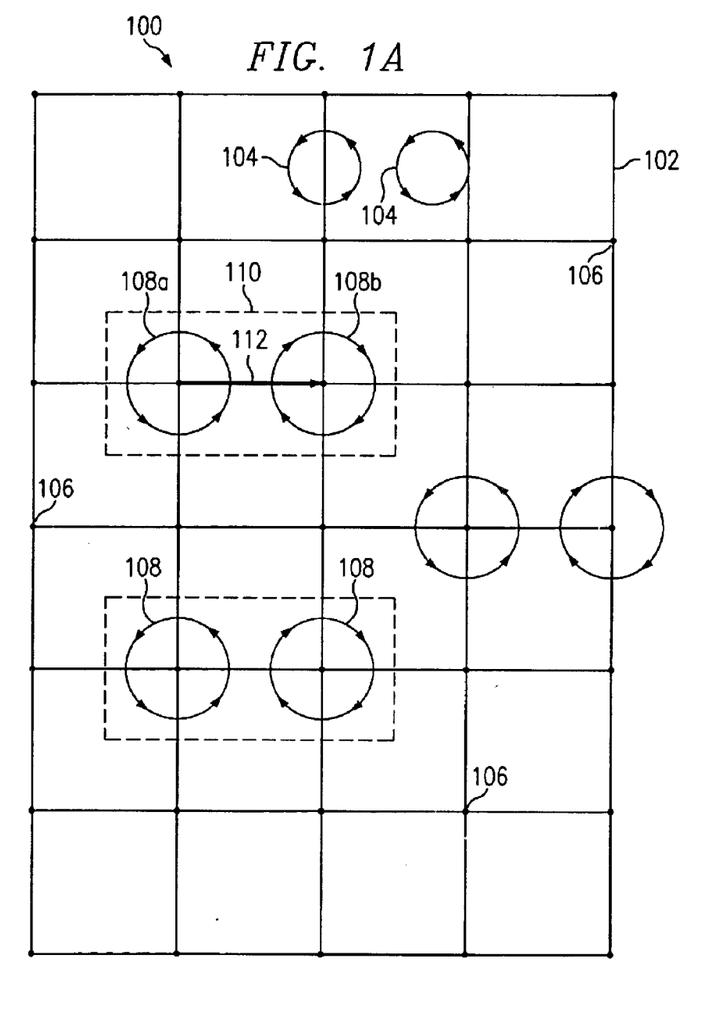
FIG. 1A illustrates a superconducting material with pinning sites in accordance with a particular embodiment of the present invention.

FIG. 1A illustrates a superconducting material 100. Superconducting material 100 may be any material that superconducts, i.e., exhibits no electrical resistance, when held at or below a characteristic critical temperature ($T_C$). It is advantageous for superconducting material 100 to be able to reach $T_C$ when cooled with liquid nitrogen (around 77 K) or other conventional coolants, so that the superconductive properties of superconducting material 100 can be exploited without requiring complex and expensive cooling systems. Such materials are well known in the art, and a wide variety of choices are available. Examples of high temperature superconductors (HTSCs) include numerous bismuth-based materials, such as type II Bi—(Pb)—Sr—Ca—Cu—O, but any existing or future superconducting material may be suitable. Superconducting material 100 may be formed as a thin film with a thickness of about one micron to encourage a uniform structure; however, other thicknesses may be used.

A doping grid 102 is superimposed on superconducting material 100 to indicate the lattice structure of the superconducting material. Although a particular lattice structure is illustrated, doping grid 102 need not have a regular periodic array. Furthermore, the superconducting material 100 may include multiple crystalline domains separated by grain boundaries or be amorphous.

Magnetic vortices 104 are quantum objects with a localized magnetic flux in a particular direction. Magnetic vortices 104 in high temperature superconducting materials typically have a core size of around 2 nm. Vortices 104 are generated by electromagnetic interactions with superconducting material 100. Vortices 104 move freely about superconducting material 100 in response to electromagnetic forces, such as the Lorentz force created by electric currents in superconducting material 100.

Pinning sites 106 are locations in superconducting material 100 that "pin" magnetic vortices, as shown by pinned magnetic vortices 108. "Pinning" refers to exerting an electromagnetic force on pinned vortex 108 such that the pinned vortex 108 is not able to move freely in superconducting material 100 in response to other electromagnetic forces. It is advantageous for the influence of each pinning site 106 to be short enough that the pinning forces for adjacent pinning sites 106 do not overlap substantially, meaning that each pinning site 106 is associated with a reasonably well-defined pinning area. Pinning sites 106 with overlapping pinning areas may be used, however, if vortices 104 can be generated in sufficient proximity to pinning sites 106 or if sufficient spacing is allowed between pinning sites 106 actually used to pin vortices 104. In such cases, a vortex 104 may be reliably pinned by generating the vortex 104 in sufficiently close proximity to one of the pinning sites 106 that the force from that pinning site 106 will overpower the overlapping pinning forces from other pinning sites 106.

One method of creating pinning sites is to dope superconducting material 100 with particles of another material, such as manganese, vanadium, uranium, hafnium, or any other suitable doping material. For purposes of this specification, "particles" refers generally to atoms, molecules, or any other tiny portions of a substance or substances, including small groups or collections of atoms and/or molecules. Although pinning sites 106 are shown at the intersection of grid 102 lines, it is not necessary for the location of pinning sites to bear any particular relation to the lattice or grain structure of superconducting material 100. It is useful for pinning sites 106 to be situated in some regular arrangement in superconducting material 100 for ease in mapping and locating pinning sites 106. However, techniques exist for employing heterogeneous storage media as well, such as hierarchical memory structure and block accessing techniques.

In operation, vortices 106 are generated near pinning sites 106 using suitable techniques, such as those described later in conjunction with FIGS. 2A and 2B. Pinned vortices 108 are detected, and the positions of pinned vortices 108 are interpreted as information. For example, an empty pinning site 106 is interpreted as a "zero," while a pinning site 106 with a pinned vortex 108 is interpreted as a "one." In principle, this allows the density of information storage to equal the density of the pinning sites, which may potentially be deposited with a spacing of 2–5 nm, on the order of the size of the vortex 104 cores themselves. Even at coarser resolution, such as 100 nm spacing, superconducting material 100 can store $10^{10}$ bits per $cm^2$, a storage density which is comparable to current day leading edge silicon/copper wafer technology. One advantage of some materials, including Bi—(Pb)—Sr—Ca—Cu—O, is that they may store a high density of magnetic vortices, allowing more pinned vortices 108 to be stored in a given area of superconducting material 100. Not every pinning site 106 needs to be used in order for superconducting material 100 to effectively store information, and pinned vortices 108 may be arranged in a variety of positions and/or patterns without substantially affecting the information storage functions of superconducting material 100.

Figure 1B:
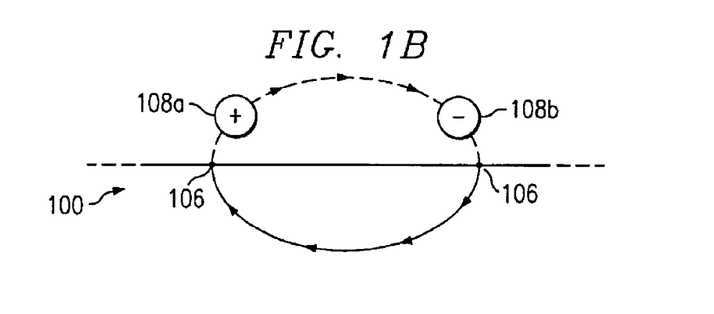
FIG. 1B is a perspective of the superconducting material of FIG. 1A showing field lines.

In a particular embodiment, pinned vortices 108 are stored in pairs with one pinned vortex 108 having a flux in the opposite direction from the paired pinned vortex 108, thus forming a magnetic dipole 110. One example of such an embodiment is illustrated in FIG. 1A. Pinned vortices 108a and 108b are pinned at adjacent pinning sites 106a and 106b. Pinned vortex 108a is shown as a counterclockwise vortex, indicating a magnetic flux out of the page according to the convention of the right hand rule. Pinned vortex 109a has a magnetic flux in the opposite direction, shown by the clockwise arrow. A particular way to do this is by placing a dipole magnet in close proximity to superconducting material, as described in greater detail later in conjunction with FIG. 2. One advantage of pairing pinned vortices 108 with opposite signs is that the net magnetic flux of superconducting material 100 is zero or nearly so (i.e., within the flux of a few vortices of zero) so that superconducting material 100 will not radiate magnetic fields that may be damaging to external components and so as to minimize the net magnetic flux that might otherwise destroy the superconducting properties. Furthermore, the magnetic field gradient 112 between pinned vortices 108 of opposite sign may be easier to detect than individual pinned vortices 108. FIG. 1B is a perspective view of dipole 110 showing arrows representing magnetic field lines. A dipole may also be produced by orienting a pinned magnetic vortex 108 so that the magnetic field lines emanating from the pinned vortex 108 form a closed loop near the surface of superconducting material 100.

Figure 2A:
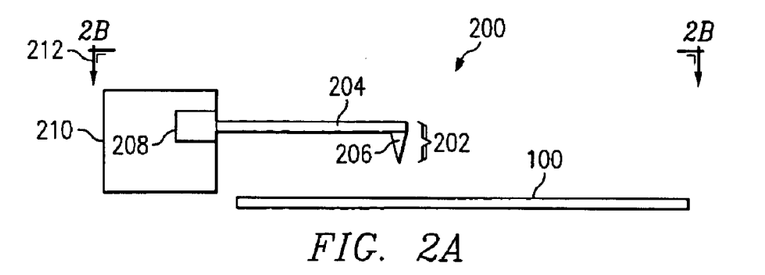
FIGS. 2A and 2B show an information storage system in accordance with a particular embodiment of the present invention.
Figure 2B:
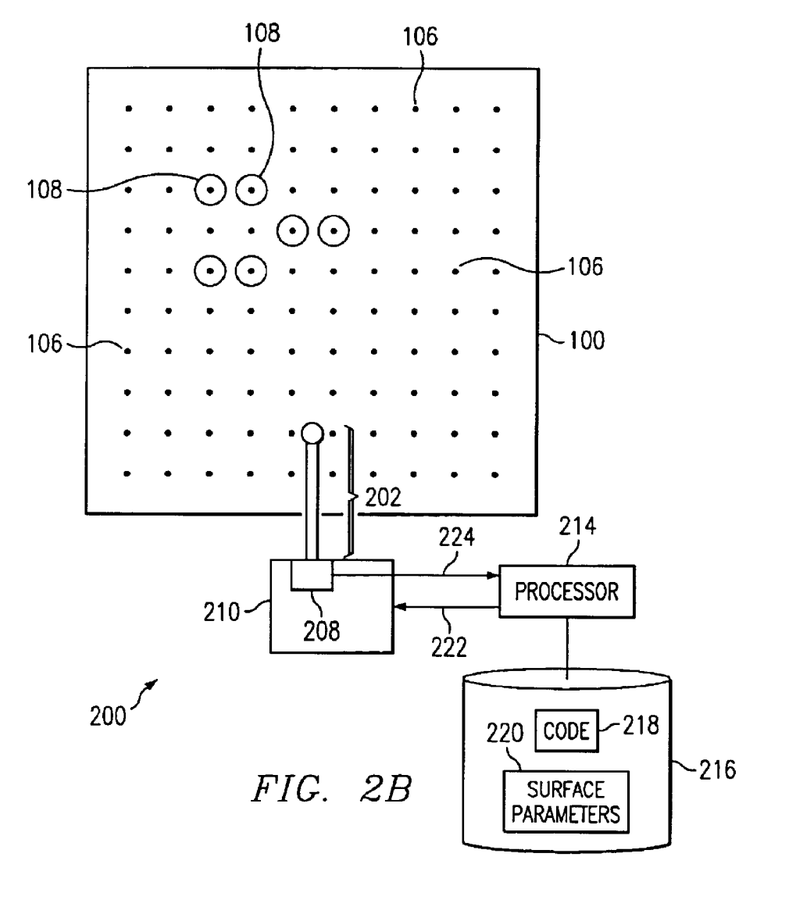

FIGS. 2A and 2B are perspective views of an information storage system 200 using superconducting material 100. Although particular details are described for this embodiment, it should be understood that the described system is only one of many possible examples of an information storage system 200 using superconducting material 100. System 200 includes a magnetic force microscope (MFM) 202 that is positioned relative to superconducting material 100 in three dimensions using a positioning system 210. MFM 202 reads and writes information in the form of pinned magnetic vortices 108 in superconducting material 100.

MFM 202 includes a cantilever 204 and a magnetic tip 206. Cantilever 204 represents any movable arm of the type usually employed in atomic and magnetic force microscopy. Cantilever 204 is positioned relative to superconducting material using positioning system 202. Cantilever 204 may be coupled to a detector 208 that detects flexion and/or small quantities of motion in cantilever 204 created by magnetic or electrostatic forces on tip 206, such as those created by pinned magnetic vortices 108 near tip 206.

Magnetic tip 206 may be used both to detect pinned vortices 108 and to generate them. In this example, tip 206 may be any one of a number of tips used in atomic and magnetic force microscopy with points sufficiently fine to resolve positions on the nano scale (10–100 nm). Such tips are formed by anisotropic chemical etching techniques familiar to one skilled in the art. Although tips 206 are typically ferromagnetic, it should be understood that any material may be used that is susceptible to magnetization, although high-flux magnetic materials are particularly desirable. Coatings, such as cobalt films, may be applied to tip 206 to increase its sensitivity to magnetic forces or to increase the susceptibility of tip 206 to magnetization.

Positioning system 210 may include any suitable combination of hardware and/or software usable to position magnetic tip 206 with nano-scale precision, including conventional techniques for MFM positioning. However, positioning system 210 can also incorporate more complex nano-positioning technology, such as the concentrated-field magnet matrix or other magnetic levitation techniques. The resolution of positioning system 210 need only be sufficient to match the desired density of pinning sites 106 in superconducting material 100.

In operation, system 200 may read information stored in superconducting material as follows. Tip 206 is positioned near superconducting material 100 using positioning system 210. Tip 206 experiences a magnetic force when positioned sufficiently close to a pinned vortex 108. The magnetic force from a pinned vortex 108 moves tip 206, thereby producing motion in cantilever 204 that is in turn detected by detector 208. By this method, MFM 202 detects the presence or absence of pinned vortices 108 at pinning sites 106. Tip 206 may also be used to generate pinned vortices 108.

To generate pinned vortices 108, tip 206 is positioned at or between pinning sites 106 and moved to the surface of superconducting material 100 using positioning system 210. When brought near to the surface of superconducting material 100, tip 206 produces a magnetic vortex 104 sufficiently close to one of the pinning sites 106 to generate a pinned magnetic vortex 108. In a particular embodiment, tip 206 is a magnetic dipole that produces paired pinned magnetic vortices 108, each with a magnetic flux in the opposite direction as the other. In another embodiment, tip 206 is formed asymmetrically to produce dipoles 110 in superconducting material 100.

FIG. 2B illustrates the system 200 of FIG. 2A as viewed along lines 212. Detector 208 and positioning system 210 are coupled to a processor 214 and a memory 216. Processor 214 represents a microprocessor, micro-controller, or any other combination of hardware and/or software suitable for processing information. Memory 216 represents any form of information storage, whether volatile or non-volatile, local or remote, accessible by processor 214. Memory 216 stores code 218 that is executed by processor 214 and also stores surface parameters 220. Surface parameters 220 are usable by processor 214 to determine the location of pinning sites 106 in superconducting material 100. For example, surface parameters 220 could include information about the crystalline structure of superconducting material 100, the spacing of pinning sites 106 or any other suitable information to assist in the identification of locations on superconducting material 100.

In one embodiment, in the "read" mode of operation, processor 214 sends an instruction 222 to positioning system 210 to position the tip 206 of MFM 202 at the location to be read. If the location has been previously "written" with a pinned vortex 108 or magnetic dipole 110, detector 208 detects a magnetic force on MFM 202, generates a signal 224 in response to the detection, and communicates signal 224 to processor 214. Signal 224 may then be interpreted as a "one" at the memory location. On the other hand, if the location to be read has not been written, detector 208 communicates a signal 224 indicating that the location is empty. Signal 224 may then be interpreted as a "zero" at the memory location.

In the "write" mode of operation, processor 214 sends an instruction 222 for positioning system 210 to position the tip 206 of MFM 202 at the location to be written. Processor 214 then instructs positioning system 210 to bring tip 206 to within a predetermined distance of superconducting material 100, thereby creating pinned magnetic vortices 108 at pinning sites 106. Processor 214 then instructs positioning system 210 to bring tip 206 back to its read position. The information can also be overwritten or "erased" by using the same method as it was written.

Numerous variations on system 200 and its modes of operation will be apparent to one skilled in the art. For example, separate MFMs 202 could be used for writing and reading information to superconducting material 100. Furthermore, system 200 could include arrays of MFMs 202 positioned over superconducting material 100 that could perform multiple reads and/or writes. Other techniques for generating and/or detecting pinned magnetic vortices 108 could be used in place of MFM 202. Because of the wide range of possible variations, the system 200 described should be viewed as an illustration only and not as an exclusive definition.

Figure 3:
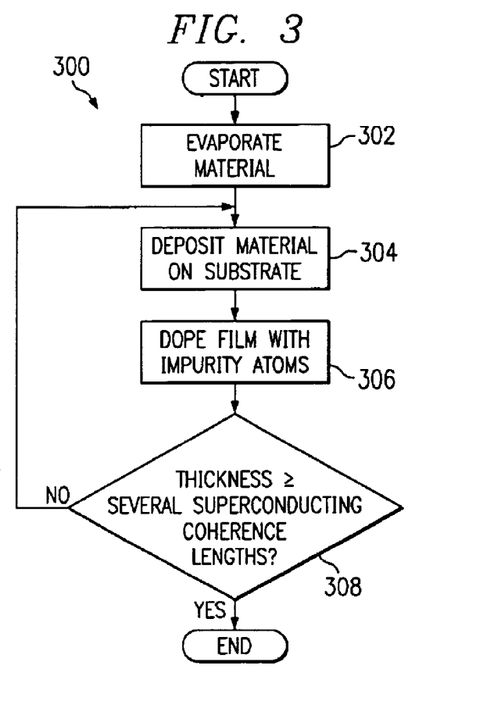
FIG. 3 is a flowchart showing a method of fabricating the superconducting material of FIG. 1A.

FIG. 3 is a flowchart 300 illustrating an example of a method for fabricating a thin film of superconducting material 100 using physical vapor deposition (PVD) in a vacuum chamber. Many other possible methods will be apparent to one skilled in the art, so the described method should be taken as an illustration and not as an exclusive definition. At step 302, the material to be used in the thin film is evaporated. A wide range of techniques for evaporating the material are available, including conductive heating, resistance heating, bombardment with electron beams, magnetron sputtering, or any other suitable techniques used to evaporate material. The number, position and geometry of the sources of material and the heating source and the rate of heating may be modified to influence the pattern of evaporation and/or deposition. In one embodiment, a single source is used in order to encourage uniformity in the structure of the thin film.

At step 304, material is deposited on a substrate in order to epitaxially grow the thin film. Growing the film is primarily influenced by three factors: the material of the substrate (typically a single crystal with a modified perovskite structure), the amount and direction of the flux of evaporated material onto the substrate, and the pressure of gases (such as oxygen and argon) in the PVD chamber. All of these factors may be varied to influence the quality of the thin films and their rate of production. Additional techniques, such as molecular beam epitaxy and infrared heated epitaxial growth, may be incorporated in PVD to influence the deposition of material as well.

The thin film is doped with impurity atoms to create pinning sites at step 306. Doping may be performed while the thin film is being deposited to encourage a uniform concentration of impurity atoms. Impurity atoms may include Mn, Hf, V, U, or any other suitable material which has the property of pinning magnetic vortices in a superconductor. The impurity atoms may be mixed with evaporated material to encourage uniform distribution of the impurity atoms within the thin film. The concentration of impurity atoms typically ranges from 200 to 2000 parts per million, depending on the desired concentration of pinning sites in the thin film and the size and spacing of magnetic vortices in the thin film.

At step 308, it is determined whether the thickness of the film has reached at least several superconducting coherence lengths. This typically involves measuring how long the deposition process has gone on, and determining the thickness based on previously characterized films. If the thin film has yet to reach the desired thickness, the deposition and doping steps continue. If the thin film has reached the desired thickness, the method is complete.

There are numerous possible embodiments of the described method. In one illustrative embodiment, a single source of Bi—(Pb)—Sr—Ca—Cu—O is deposited on a LaSrGaO$_4$ single crystal substrate, which has a low percentage (0.5%) of lattice mismatch. Alternative substrates include polyimide, a flexible substrate, with a perovskite buffer layer on the surface of the polyimide. Radio frequency magnetron sputtering is used to evaporate and deposit the material on the substrate. During growth of the thin film, vanadium impurities are introduced into the film to produce a impurity atom concentration between 500 and 1000 ppm.

As noted above, the method and the particular implementation presented are examples of a method for fabricating a superconducting material with pinning sites. Other methods might include chemical vapor deposition (CVD) or molecular beam epitaxy (MBE). The particular embodiments presented should be seen as illustrative examples rather than as exclusive definitions. In particular, where variations and modifications would be apparent to one skilled in the art, such variations and modifications should be understood to be included within the scope of the description.

Figure 4:
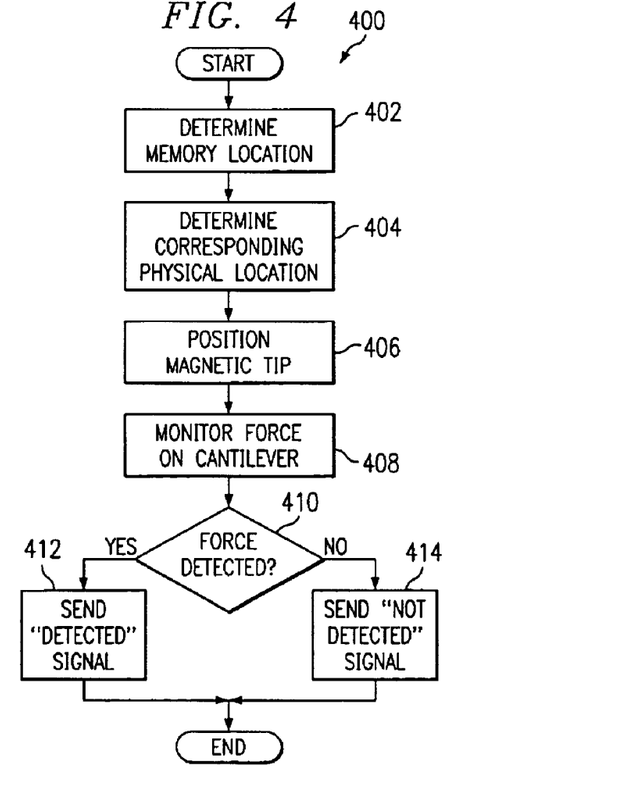
FIG. 4 is a flowchart showing a method for reading information using the system of FIG. 2.

FIG. 4 is a flowchart 400 showing a method for using system 200 in FIG. 2 to retrieve stored information from superconducting material 100. Information storage system 200 determines the memory location to be read at step 402. System 200 determines a corresponding physical location in superconducting material 100 at step 404. System 200 positions tip 206 of MFM 202 at the corresponding physical location at step 406.

Once tip 206 is in position, detector 208 monitors the force on cantilever 208. At step 410, detector 208 determines if force on cantilever 208 has been detected. If a force has been detected, detector 208 sends a "Detected" signal at step 412, indicating a pinned vortex at the memory location. The "Detected" signal may be interpreted as a "one" at the memory location. If a force is not detected, detector 208 sends a "Not Detected" signal at step 414, indicating that the memory location is empty. The "Not Detected" signal may be interpreted as a "zero" at the memory location.

The described method for reading information stored in a superconducting material is one of many possible methods. For example, other methods of detecting magnetism, such as superconducting quantum interference devices (SQUIDs), could be used in the method. Consequently, the described method should be viewed as an illustrative example rather than as an exclusive definition.

Figure 5:
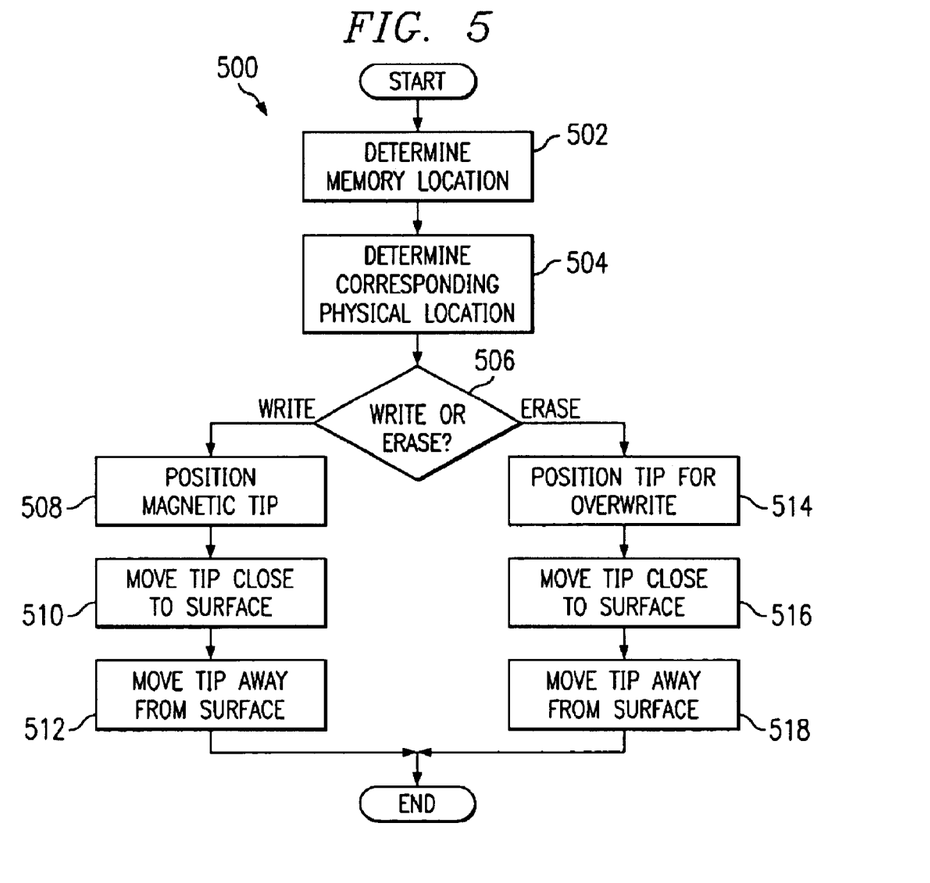
FIG. 5 is a flowchart showing a method for writing information to memory locations in the superconducting material of FIG. 1A.

FIG. 5 shows a flowchart 500 illustrating a method for writing information on superconducting material 100. A memory location is determined at step 502. The corresponding physical location on the superconducting material is determined at step 504. At decision step 506, a determination is made whether the location needs to be assigned a polarity ("written") or whether the polarity needs to be changed ("overwritten" or "erased").

To write at the location, a magnetic tip is positioned near the corresponding surface position of the memory location at step 508. The tip is moved close to the surface of the superconducting material at step 510 so that a magnetic vortex is pinned at the pinning site corresponding to the memory location. The tip is then retracted from the surface at step 512.

To overwrite the location, a tip is re-positioned at step 514 to assign the opposite polarity to the memory location, and the tip is moved to the surface at step 516. Alternatively, a magnetized tip may be used in a slightly different position so as to manipulate existing magnetic vortices at the pinning site. The tip is then retracted from the surface at step 518.

The described method for writing and overwriting/erasing memory locations in a superconducting material is only one of many possible examples of such a method. Other methods of generating and disrupting magnetic vortices could be substituted by one skilled in the art. Consequently, the described method should-be not be construed to exclude other possible variations apparent to one skilled in the art.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An information storage apparatus, comprising:
   a superconducting material;
   a plurality of doped particles within the superconducting material operable to pin one or more magnetic vortices;
   a magnetic tip operable to be positioned in sufficiently close proximity to each of the pinning sites to generate a pinned magnetic vortex at the pinning site; and
   a magnetic detector operable to detect any magnetic vortices pinned at any of the pinning sites, wherein:
   each pinned magnetic vortex has a magnetic flux; and
   each pinned magnetic vortex is associated with a corresponding pinned magnetic vortex having a magnetic flux in the opposite direction of the flux of the pinned magnetic vortex.

2. The apparatus of claim 1, wherein the doped particles comprise doped atoms.

3. The apparatus of claim 1, wherein the superconducting material comprises a thin film having a thickness of at least several superconducting coherence lengths.

4. The apparatus of claim 3, wherein the thin film is formed using radio frequency magnetron sputtering.

5. The apparatus of claim 1, wherein the superconducting material is Bi—(Pb)—Sr—Ca—Cu—O.

6. The apparatus of claim 1, wherein the pinned magnetic vortices are associated with the corresponding pinned magnetic vortices such that the net magnetic flux of the superconducting material is zero or nearly zero.

7. The apparatus of claim 1, wherein the detector is operable to detect the pinned magnetic vortices by detecting the position of a dipole formed by the pinned magnetic vortex and the corresponding pinned magnetic vortex by detecting a magnetic field gradient between the pinned magnetic vortex and the corresponding magnetic vortex.

8. An information storage apparatus, comprising:
   a superconducting material;
   a plurality of doped particles within the superconducting material operable to pin one or more magnetic vortices;
   a magnetic tip operable to be positioned in sufficiently close proximity to each of the pinning sites to generate a pinned magnetic vortex at the pinning site; and
   a magnetic detector operable to detect any magnetic vortices pinned at any of the pinning sites, wherein:
   each pinned magnetic vortex has a magnetic flux at a first exit point; and
   each pinned magnetic vortex has a corresponding magnetic flux at a second exit point in the opposite direction of the magnetic flux at the first exit point of the pinned magnetic vortex such that a closed loop of magnetic field lines is formed outside of the superconducting material.

9. The apparatus of claim 8, wherein the doped particles comprise doped atoms.

10. The apparatus of claim 8, wherein the superconducting material comprises a thin film having a thickness of at least several superconducting coherence lengths.

11. The apparatus of claim 10, wherein the thin film is formed using radio frequency magnetron sputtering.

12. The apparatus of claim 8, wherein the superconducting material is Bi—(Pb)—Sr—Ca—Cu—O.

13. Information embodied as magnetic vortices in a superconducting material, comprising:

a plurality of pinning sites in a superconducting material operable to pin a magnetic vortex in close proximity to the pinning site within the superconducting material; and one or more of the magnetic vortices pinned at one or more of the pinning sites, wherein:

each pinned magnetic vortex has a magnetic flux; and each pinned magnetic vortex is associated with a corresponding pinned magnetic vortex having a magnetic flux in the opposite direction of the flux of the pinned magnetic vortex.

14. The information of claim 13, wherein the pinning sites comprise impurity atoms doped in the superconducting material.

15. A method, comprising:

providing a superconducting material having a plurality of pinning sites comprising doped particles operable to pin a magnetic vortex in the superconducting material when the magnetic vortex is in close proximity to the pinning site; and pinning one or more magnetic vortices at one or more of the pinning sites, wherein:

each pinned magnetic vortex has a magnetic flux; and each pinned magnetic vortex is associated with a corresponding pinned magnetic vortex having a magnetic flux in the opposite direction of the flux of the pinned magnetic vortex.

16. The method of claim 15, further comprising:

detecting a position for each pinning site at which one of the magnetic vortices is pinned; and interpreting the positions as stored information.

17. The method of claim 15, wherein the superconducting material comprises a thin film having a thickness of at least several superconducting coherence lengths.

18. The method of claim 17, wherein the thin film is formed using radio frequency magnetron sputtering.

19. The method of claim 15, wherein the superconducting material is Bi—(Pb)—Sr—Ca—Cu—O.

20. The method of claim 15, wherein the pinning sites comprise doped atoms in the superconducting material.

21. The method of claim 20, wherein the doped atoms are selected from the group consisting of: manganese, vanadium, uranium and hafnium.

22. The method of claim 15, wherein the step of pinning one or more magnetic vortices comprises positioning a magnetic tip in sufficiently close proximity to the one or more pinning sites to generate a pinned magnetic vortex at respective ones of the one or more pinning sites.

23. The method of claim 15, wherein the pinned magnetic vortices are associated with the corresponding pinned magnetic vortices such that the net magnetic flux of the superconducting material is zero or nearly zero.

24. The method of claim 15, further comprising detecting the position of a dipole formed by the pinned magnetic vortex and the corresponding pinned magnetic vortex by detecting a magnetic field gradient between the pinned magnetic vortex and the corresponding magnetic vortex.

25. A method, comprising:

providing a superconducting material having a plurality of pinning sites comprising doped particles operable to pin a magnetic vortex in the superconducting material when the magnetic vortex is in close proximity to the pinning site; and pinning on or more magnetic vortices at one or more of the pinning sites, wherein:

each pinned magnetic vortex has a magnetic flux at a first exit point;

each pinned magnetic vortex has a corresponding magnetic flux at a second exit point in the opposite direction of the magnetic flux at the first exit point of the pinned magnetic vortex such that a closed loop of magnetic field lines is formed outside of the superconducting material.

26. The method of claim 25, further comprising:

detecting a position for each pinning site at which one of the magnetic vortices is pinned; and interpreting the positions as stored information.

27. The method of claim 25, wherein the superconducting material comprises a thin film having a thickness of at least several superconducting coherence lengths.

28. The method of claim 27, wherein the thin film is formed using radio frequency magnetron sputtering.

29. The method of claim 25, wherein the superconducting material is Bi—(Pb)—Sr—Ca—Cu—O.

30. The method of claim 25, wherein the pinning sites comprise doped atoms in the superconducting material.

31. The method of claim 30, wherein the doped atoms are selected from the group consisting of: manganese, vanadium, uranium and hafnium.

32. The method of claim 25, wherein the step of pinning one or more magnetic vortices comprises positioning a magnetic tip in sufficiently close proximity to the one or more pinning sites to generate a pinned magnetic vortex at respective ones of the one or more pinning sites.

33. A method for reading stored information in a superconducting material, comprising:

providing a superconducting material having pinning sites, each pinning site operable to pin a magnetic vortex in close proximity to the pinning site; and detecting any pinned magnetic vortices at any of the pinning sites, wherein:

each pinned magnetic vortex has a magnetic flux; and each pinned magnetic vortex is associated with a corresponding pinned magnetic vortex having a magnetic flux in the opposite direction of the flux of the pinned magnetic vortex.

34. The method of claim 33, wherein the step of detecting comprising:

positioning a magnetic force microscope comprising a cantilever and a magnetic tip in close proximity to one of the pinning sites; and detecting any deflection in the cantilever.

* * * * *